United States Patent Office 2,885,395
Patented May 5, 1959

2,885,395
CHEMICAL PROCESS

Jared H. Ford, Kalamazoo Township, Kalamazoo County, Mich., assignor to The Upjohn Company, Kalamazoo, Mich., a corporation of Michigan No Drawing. Application November 29, 1957
Serial No. 699,477

2 Claims. (Cl. 260—210)

This invention relates to a chemical process and is particularly concerned with the recovery of novobiocin. More particularly, the invention relates to an improved process for the clarification of the whole broth by filtration, wherein the improvement is obtained by continuously adjusting successive aliquots of the whole broth to an alkaline pH immediately prior to the actual passage through a filter, and readjusting the filtrate continuously to an acid pH immediately after filtration.

It has been found that the prior art methods for clarifying the whole broth obtained in a novobiocin fermentation results in excessive retention of the novobiocin in the mycelial cake and in excessive losses due to alkaline degradation of the novobiocin. It is an object of the invention, therefore, to provide a process for clarifying novobiocin-containing whole broth in which loss of novobiocin due to retention in the mycelial cake and/or alkaline degradation is minimized. Other objects will be apparent to those skilled in the art to which this invention pertains.

It has been the practice heretofore, in clarifying the whole broth, to adjust the pH of an entire batch of whole broth to about pH eight, to clarify the batch by filtration and then to readjust the batch to about pH six to about pH seven. It has been found in accordance with this invention that this practice of the prior art causes an unnecessarily high loss of novobiocin and that this loss can be minimized by continuously adjusting successive aliquots of the whole broth to an alkaline pH immediately prior to the actual passage through a filter, and readjusting the filtrate continuously to an acid pH immediately after filtration whereby only a relatively small portion of the total amount of the whole broth is at an alkaline pH, at any given time, and none of the whole broth is at an alkaline pH for any extended length of time. By following this procedure only a small portion of the total amount of the whole broth is at an alkaline pH, at any given time, and none of the whole broth is at an alkaline pH for any extended length of time. It has been found further that in the process of this invention, it is possible to use a significantly higher pH without excessive alkaline degradation and that, by so doing, significantly less novobiocin is retained in the mycelial cake. It has been found also that losses are still further minimized by using for the pH adjustments strongly buffering materials, such as salts of weak organic or inorganic acids, rather than alkalis.

It has been found both advantageous and desirable, in the practice of this invention as described, to raise the pH of the whole beer prior to filtration to between about pH 8.5 to about pH ten and preferably to about pH 8.5 to about pH 9.5 and to readjust the pH of the filtrate to about pH 5.5 to about pH 7.5, and preferably to about pH 6.3 to about pH 6.6.

It is advantageous to use buffer salts for the alkaline pH adjustment prior to the filtration. Alkaline buffer salts of choice include the alkaline earth, and alkali-metal carbonates, phosphates, and borates, and the like, although any water-soluble salt of a weak acid and a strong base can be used, for example, the alkali-metal and ammonia salt of weak oxyacids, like sodium carbonate, potassium acetate, sodium borate, trisodium phosphate, sodium citrate, tris(hydroxymethyl)aminomethane, and the like, can be used. Aqueous solutions of such salts can easily be metered into a filter trough of a filter, as required, automatically if desired, in response to pH control apparatus associated with the trough. Ordinary alkalis such as sodium hydroxide can be used if desired but are not desirable because of their actions, lack of buffering capacity, and because of their tendency to give local zones of excessive alkalinity and consequently alkaline degradation of the novobiocin.

The acid pH adjustment can likewise be made, on demand of pH electrodes in the filtrate receiver tank, continuously by varying the flow of acid to the receiver. The acids of choice are phosphoric acid and weak organic acids such as acetic acid, lactic acid, citric acid and like acids having buffering properties in the pH range from about pH 5.5 to about pH 7.5. Ordinary strong acid, however, such as sulfuric acid, and hydrochloric acid, can be used. The unbuffered broth tends to drift downward in pH during filtration, and therefore a buffered solution is advantageous and desirable.

In a preferred embodiment of the invention the whole beer is fed continuously to the feed trough of continuous filter where continuous pH adjustment of the successive aliquots of whole broth in the feed trough is made. Because the capacity of such troughs represents only a small fraction of the total quantity of the whole broth being filtered, ordinarily less than ten percent, the time that each successive aliquot is held at an alkaline pH represents a correspondingly small portion of the total time. Consequently, for all practical purposes, each aliquot, immediately after its pH is adjusted to the alkaline side, is filtered and immediately after the filtration, is readjusted to the acid side. In this manner, the time that any given aliquot is held at a high alkaline pH is minimized. Consequently, a higher pH can be used effectively in the process of the invention than in the prior art processes. Furthermore, the amount of whole broth that would be exposed to an excessively high pH due to inadvertent or accidental overadjustment of pH is negligible. The process of the invention therefore makes it possible simply and effectively to clarify the whole broth with a minimal loss of novobiocin in the mycelial cake and a minimal loss of novobiocin due to alkaline degradation.

Some of the limits of the invention are that the trough capacity be no greater than about five percent of the total volume of whole broth to be filtered, and preferably about two percent or less, that the filter through-put be about at least five percent of the filter feed trough volume per minute, and preferably ten percent. Where the size of one unit filter is insufficient for the whole batch, more than one must be used to come within the limits imposed above.

The invention can be more fully understood by reference to the following examples which are given by way of illustration only and are not to be construed as limiting.

EXAMPLE 1

To a 500-milliliter Erlenmeyer flask was added 100 milliliters of the following sterile medium:

| | Grams |
|---|---|
| Glucose monohydrate | 10 |
| Sodium chloride | 5 |
| Peptone, Difco | 5 |
| Beef extract | 10 |
| Tap water to 1 liter. | |

After inoculation with an aqueous spore suspension of

*S. niveus* (obtained from a conventional maltose-tryptone-agar slant), the flask containing the medium was incubated on a reciprocating shaker at 28 degrees centigrade for 72 hours. The resulting growth was the preseed.

Twelve liters of the following sterile medium:

|  | Grams |
|---|---|
| Glucose monohydrate | 25 |
| Cottonseed meal, extracted | 40 |
| Tap water to 1 liter. | | in a 25-liter stainless steel seed fermentor bottle was inoculated with 25 milliliters of the above-obtained preseed. The culture was incubated for two days at 28 degrees centigrade, accompanied by agitation and aeration (six liters per minute). The resulting growth was the seed.

250 liters of the following sterile fermentor medium:

|  | Grams |
|---|---|
| Glucose monohydrate | 14 |
| Starch | 12.5 |
| Distiller's solubles [1] | 20 |
| Tap water to 1 liter. | |

[1] Dried effluent of screened stillage obtained from yeast fermentation.

in a 100-gallon resin-coated steel fermentor was inoculated with twelve liters of the above-obtained seed. The fermentation medium was maintained at a temperature of 28 degrees, accompanied by agitation at the rate of 280 r.p.m. with draft-tube type agitation and aerated with air at 200 standard cubic feet per hour. To control foaming, 300 milliliters of lard oil was added to the medium initially and 600 milliliters of a one percent solution of octadecanol in lard oil was added during the course of the fermentation. The beer was harvested after 114 hours.

A 225-liter aliquot portion of the whole broth was mixed with about ten kilograms of a diatomaceous earth filter aid and this was piped in to a feed trough of an operating continuous rotary vacuum filter, where the pH was adjusted to pH 9.0 continuously by the continuous addition of a ten percent sodium carbonate solution and the broth passed through the filter continuously at a rate of one liter per minute. Since the filter trough held ten liters, any aliquot of one liter was not at a high pH for over about ten minutes. The filtered broth was run into a holding tank where the pH was maintained at about pH 6.3 to about pH 6.6 by the continuous addition of 85 percent phosphoric acid. A total of sixty milliliters of 85 percent phosphoric acid was required for adjustment of the total filtrate to pH 6.5. This resulted in a five percent increase in yield as compared to batch pH adjustment as in prior art.

EXAMPLE 2

The process of Example 1 was scaled up to produce 37,000 gallons of whole broth containing 85 kilograms of novobiocin. The whole broth so produced had mixed into it six percent of a diatomaceous earth filter aid, and the mixture was filtered continuously at the rate of 100 gallons per minute through two rotary vacuum filters. The whole broth was continuously fed to the filter troughs, which had a capacity of 1000 gallons, 500 gallons each, and the broth was there adjusted to about pH nine by the continuous addition of a ten percent aqueous sodium carbonate solution on demand of pH electrodes in the trough. The average residence time for any ten-gallon aliquot was one minute; that for any one-gallon aliquot was ten minutes. The filtered broth was run directly from the filter into a holding tank where the pH was maintained at about pH 6.3 to about pH 6.6 by the addition of an 85 percent phosphoric acid solution on demand of pH electrodes in the holding tank. A total of ninety gallons of 85 percent phosphoric acid was required for the adjustment of the filtrate to a pH of 6.5. The filtered broth including the water that was used to wash the beer from the mycelium totaled 40,875 gallons and contained 65.5 kilograms of novobiocin, amounting to more than a 75 percent recovery on the filtered broth of the total novobiocin in the whole broth. This process resulted in an increase of yield of at least five percent due to lack of alkaline degradation alone.

It is to be understood that the invention is not to be limited to the exact details of operation, or exact examples given and described herein, as obvious modifications and equivalents will be apparent to one skilled in the art, and the invention is therefore to be limited only by the scope of the appended claims.

I claim:

1. A process for recovering the novobiocin from a whole broth containing the same, in which process the whole broth is clarified by filtration, the steps comprising: continuously adjusting successive aliquots of the whole beer to pH 8.5 to pH 10.0 with a sodium carbonate solution immediately prior to actual passage through the filter, and, continuously readjusting the pH of successive aliquots the filtrate to pH 6.0 to pH 7.0 with phosphoric acid immediately after filtration.

2. The process for recovering novobiocin from a fermented whole broth containing the same, wherein the whole broth is clarified by filtration, the steps comprising continuously adjusting successive aliquots of the whole broth to an alkaline pH immediately prior to the actual passage through a filter, and readjusting the filtrate continuously to an acid pH immediately after filtration whereby only a relatively small portion of the total amount of the whole broth is at an alkaline pH, at any given time, and none of the whole broth is at an alkaline pH for any extended length of time, and wherein the filter trough capacity be no greater than five percent of the total volume of whole broth, and the filter through-put be at least five percent the filter feed trough volume per minute.

References Cited in the file of this patent

Hoeksema et al.: Antibiotics & Chemotherapy, vol. VI, February 1956, pp. 143–148.